United States Patent
Hatchett et al.

(10) Patent No.: US 11,825,976 B2
(45) Date of Patent: Nov. 28, 2023

(54) RESERVOIR FOR STEAM COOKING

(71) Applicant: Electrolux Home Products, Inc., Charlotte, NC (US)

(72) Inventors: Houston Hatchett, Franklin, TN (US); James Leavy, Springfield, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 847 days.

(21) Appl. No.: 16/408,603

(22) Filed: May 10, 2019

(65) Prior Publication Data

US 2020/0352381 A1 Nov. 12, 2020

(51) Int. Cl.
*A47J 27/04* (2006.01)
*A21B 3/04* (2006.01)
*F24C 15/32* (2006.01)

(52) U.S. Cl.
CPC ............ *A47J 27/04* (2013.01); *A21B 3/04* (2013.01); *F24C 15/327* (2013.01); *A47J 2027/043* (2013.01)

(58) Field of Classification Search
CPC ....... A47J 27/04; A47J 2027/043; A21B 3/04; A21B 1/08; A21B 1/04; F24C 15/327; F24C 15/325; F24C 15/2007; F24C 15/003; F24C 7/082; F24C 15/166; F22B 1/284; F22B 1/281; F22B 1/285; H05B 6/108; H05B 6/6479
See application file for complete search history.

(56) References Cited

U.S. PATENT DOCUMENTS

| | | |
|---|---|---|
| 6,860,261 B2 | 3/2005 | Tines, Jr. |
| 7,323,662 B2 | 1/2008 | Cho et al. |
| 7,847,220 B2 | 12/2010 | Jeon et al. |
| 8,695,487 B2 | 4/2014 | Sakane et al. |
| 9,565,963 B2 | 2/2017 | Jeon et al. |
| 9,565,964 B2 | 2/2017 | Yang et al. |
| 10,451,290 B2 | 10/2019 | Mayberry |
| 2006/0000821 A1 | 1/2006 | Gerola et al. |

(Continued)

FOREIGN PATENT DOCUMENTS

| | | |
|---|---|---|
| DE | 102010043835 | 5/2011 |
| DE | 102011088448 | 6/2013 |

(Continued)

OTHER PUBLICATIONS

Cooking appliance trends. B. Barton. Full text, Oven Features "Glass-covered Broiler Element. It could be infrared (like you see on outdoor rôtisserie grills or some indoor grills) or a calrod element with six to eight loops."

(Continued)

*Primary Examiner* — Brian W Jennison
(74) *Attorney, Agent, or Firm* — Pearne & Gordon LLP

(57) ABSTRACT

There is provided a cooking appliance having an oven cavity, a fan, a heater, and a convection shroud. The fan is configured to circulate air heated by the heater to redistribute the air throughout the oven cavity. The heater configured both to heat the expelled by the fan and to generate steam from water in which the heater is immersed within a water reservoir. In described embodiments, the water reservoir is part of the convection shroud and is formed or attached together with a fan cover thereof.

19 Claims, 15 Drawing Sheets

(56) References Cited

U.S. PATENT DOCUMENTS

| | | | |
|---|---|---|---|
| 2006/0011071 A1* | 1/2006 | Cho | F24C 15/327 |
| | | | 99/417 |
| 2012/0018424 A1 | 1/2012 | Inoue et al. | |
| 2016/0066738 A1 | 3/2016 | Shibuya et al. | |
| 2018/0259192 A1* | 9/2018 | Mayberry | F24C 15/327 |
| 2020/0011538 A1 | 1/2020 | Mayberry | |
| 2020/0011539 A1 | 1/2020 | Mayberry | |

FOREIGN PATENT DOCUMENTS

| | | | | |
|---|---|---|---|---|
| EP | 1617148 A1 * | 1/2006 | | F24C 15/327 |
| EP | 3399237 A2 * | 11/2018 | | F24C 7/062 |
| KR | 100565535 | 3/2006 | | |

OTHER PUBLICATIONS

30" Double Wall Oven. Dacor.Inc. Features section—"Steam and Convection Oven The power of steam assist and convection cooking in one. Water Reservoir Easy to use / refill water reservoir for steam cooking."

* cited by examiner

RESERVOIR FOR STEAM COOKING

BACKGROUND

Field of the Invention

The following descriptions relates in general to a cooking appliance with steam cooking features and, more specifically, to a water reservoir in an oven cavity of the cooking appliance for producing steam therein utilizing a heating element.

Description of Related Art

Cooking ovens capable of steam cooking are known in the art, and generally fall into two categories: direct steam ovens and indirect steam ovens. Indirect steam ovens include a powered steam generator outside of the cooking cavity that delivers steam into the cooking cavity. This requires not only the steam generator itself but a system of pipes and valves to conduct the steam into the oven cavity. Direct steam ovens include water reservoirs inside or open to the oven cavity so that evaporated steam therefrom directly enters that cavity. Typical direct steam systems utilize a water reservoir at or formed in (or as) the bottom of the oven cavity. In this configuration, portions of a food item being cooked and/or liquids emitted therefrom during cooking can fall into the water stored in the water reservoir for producing steam, which is not desirable.

SUMMARY

The present disclosure describes a shroud that can be affixed inside an oven cavity for enclosing a fan and a heater. The shroud facilitates the use of the fan and/or heater for a convection heating cooking operation as well as a steam-assisted cooking operation.

In a first aspect, a cooking appliance has an oven cavity, a fan configured to circulate air within the oven cavity, a heater adjacent to the fan and configured to heat the air circulated by the fan, and a water reservoir defining a storage volume configured to store water, wherein the heater extends into the storage volume so that at least a portion of the heater will be immersed in water when said storage volume is filled with water. The heater and the fan are operable to generate and circulate steam within the oven cavity during a steam-cooking operation.

In a further aspect, a cooking appliance has an oven cavity, a fan configured to draw air in the oven cavity towards the fan and to expel and redistribute the air away from the fan throughout the oven cavity, a water reservoir in the oven cavity configured to store water, and a heater that substantially surrounds the fan and is configured to heat the air expelled by the fan such that the redistributed air is heated. At least a portion of the heater is received within the water reservoir such that the heater is configured to heat water present therein to steam while the fan is in operation.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION OF PREFERRED EMBODIMENTS

Figure 1:
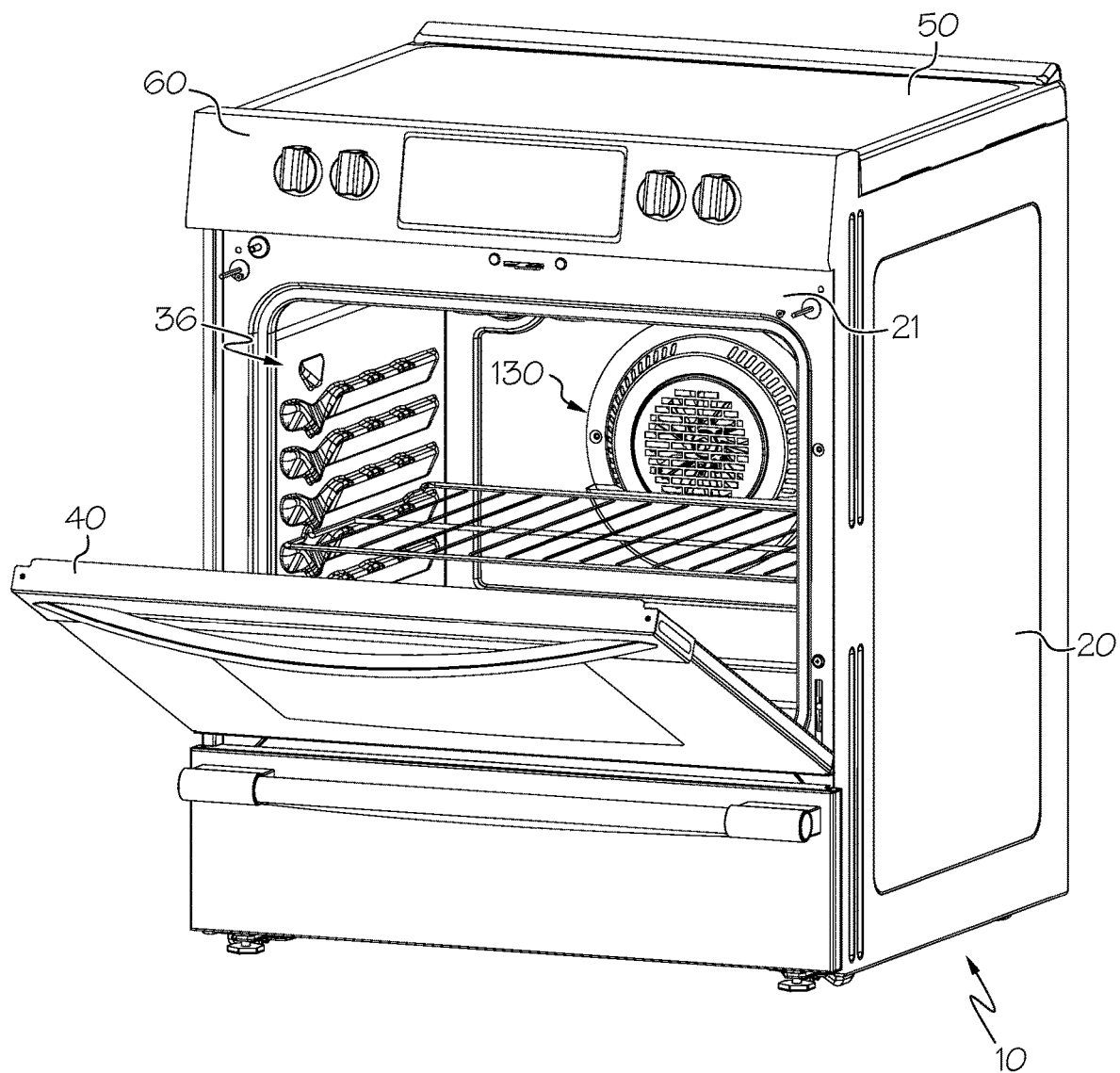
FIG. 1 shows a front perspective view of a cooking appliance having an oven cavity with a convection shroud covering convection components of the cooking appliance.

FIG. 1 illustrates a cooking appliance 10, such as an oven range. The cooking appliance 10 depicted is a freestanding range having a single oven; however the cooking appliance 10 can be of any suitable construction, such as a wall oven, a drop-in oven, slide-in oven, a double oven, etc. The cooking appliance 10 includes a body or housing 20 that has a cooking cavity, or oven cavity, 36 therein. The oven cavity 36 is closed by a door 40, which can be pivotally mounted to the front face 21 of the housing 20. Atop the housing 20 of a conventional range can be a cooktop 50 as known in the art. In some types of cooking appliances 10, such as a wall oven, a cooktop 50 may not be present. A control panel 60 may be provided at the front face 21 above the oven cavity 36 for operating the appliance 10. In other embodiments, the control panel be located elsewhere, for example at the rear of the cooktop 50. The control panel 60 is coupled to a controller (not shown) for controlling the operation of the appliance 10. The appliance 10 also includes a convection heating system as discussed in more detail below.

Figure 2:
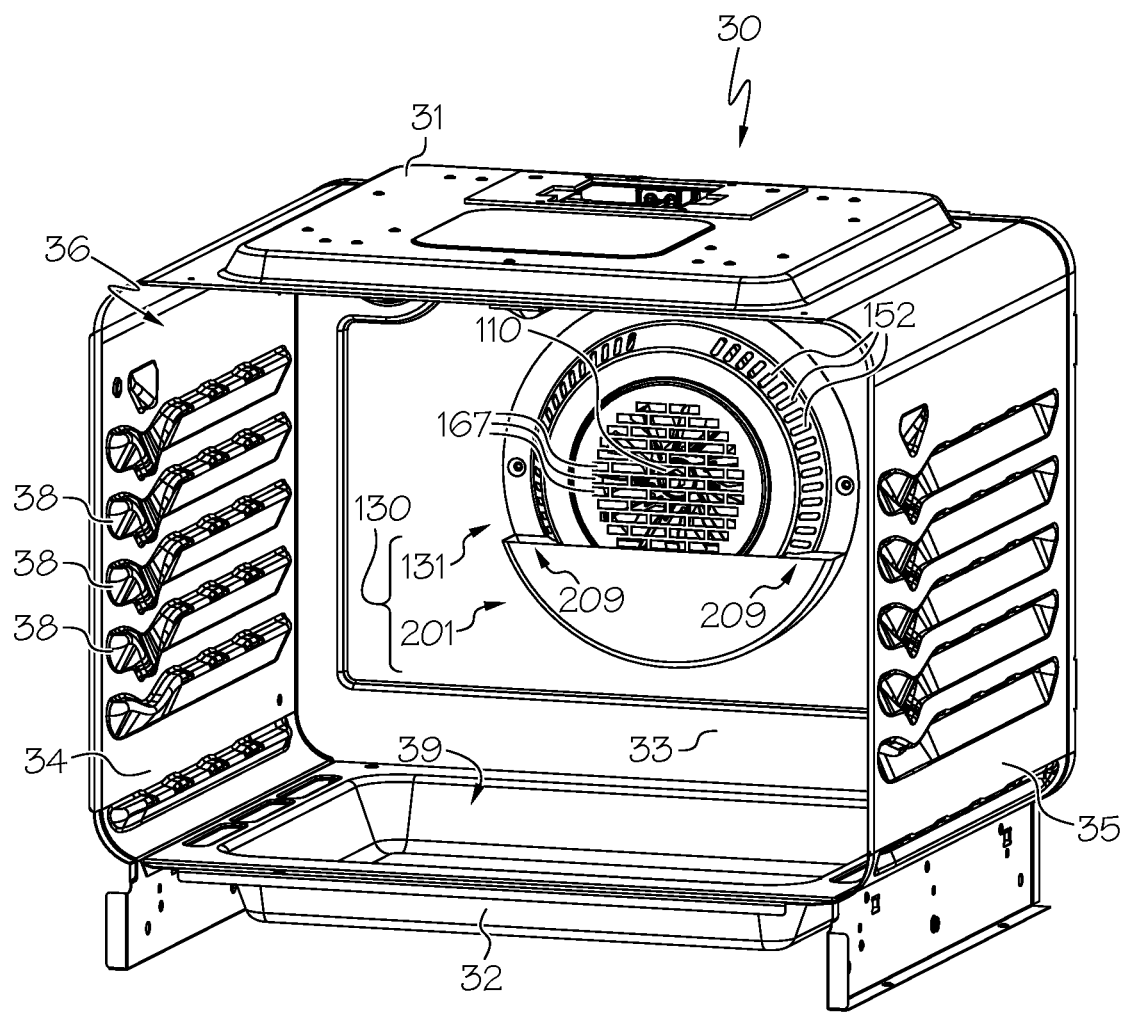
FIG. 2 shows a perspective view of the oven cavity wrapper removed from the appliance shown in FIG. 1.

As shown in FIG. 2, the cavity wrapper 30 (shown removed from the appliance) includes a top wall 31, bottom wall 32, rear wall 33, and side walls 34, 35, which together define and bound the oven cavity 36, which has an open at the front. The cavity wrapper 30 can be made of any suitable material as known in the art, including but not limited to metals, ceramics, enamel-coated steel or aluminum, and combinations thereof. The cavity wrapper 30 may be formed as a single piece of bent sheet metal (or coated sheet metal), or it may be formed from a number of different pieces that are fastened together in conventional manner, e.g. via fasteners or welding. The side walls 34, 35 can have embossed oven-rack rails 38 for supporting oven racks (see FIG. 1) as known in the art.

In the illustrated embodiment, the bottom wall 32 includes a sump 39 recessed therein and which can be used to collect liquid and solid drippings from food items cooking on racks above, and/or condensed steam or water vapor that condenses during cooking within the oven cavity 36. The sump 39 can be constituted as a removable pan that can be received in an opening at the base of the oven cavity 36 in order to facilitate efficient emptying and cleaning of the contents therefrom. Alternatively, the sump 39 can be used to effectively increase the available cooking volume of the oven cavity 36, to facilitate cooking larger volumes of food therein. In other embodiments, the bottom wall 32 can be substantially flat or planar without a sump 39.

Figure 3:
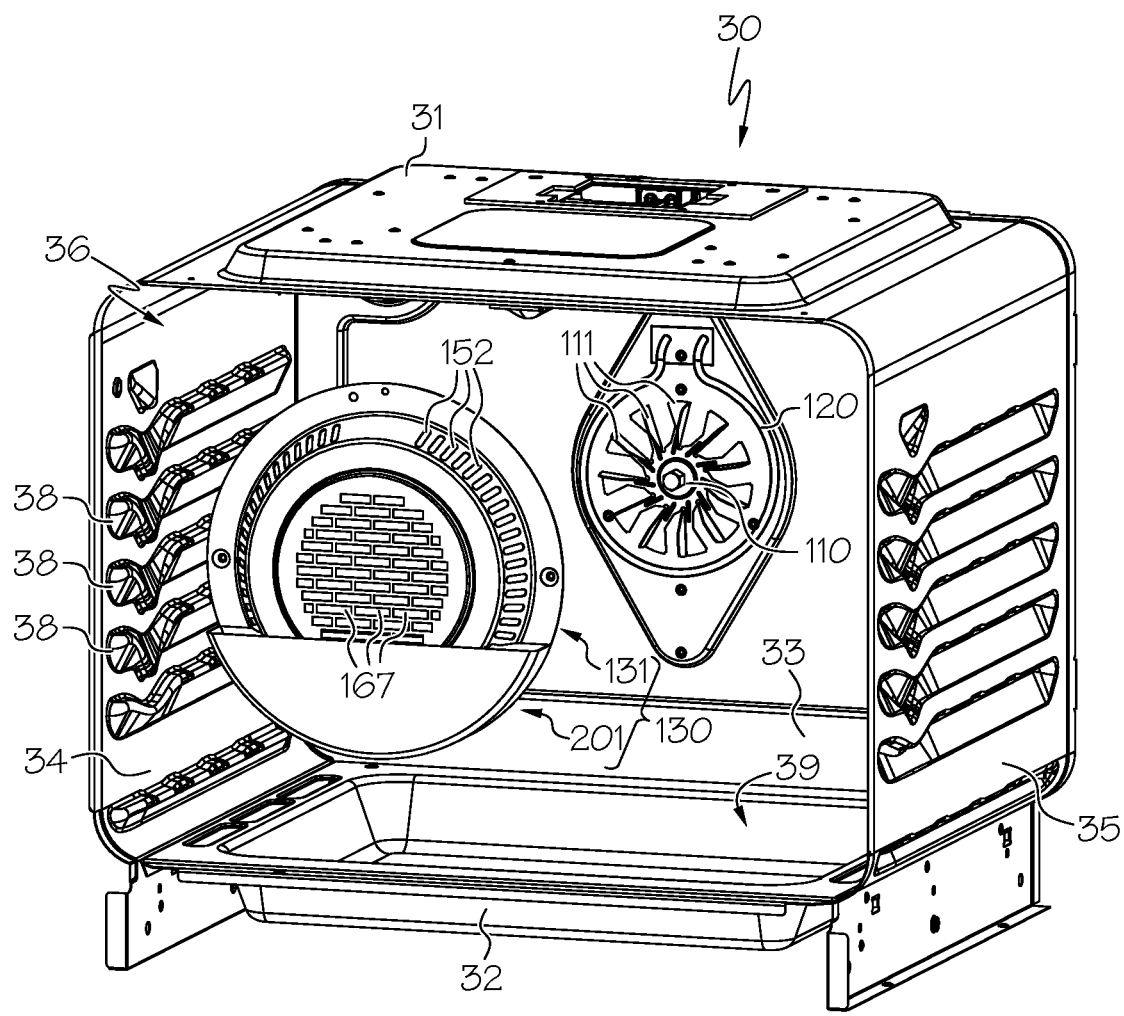
FIG. 3 shows the perspective view as in FIG. 2 with the convection shroud removed from the rear wall of the oven cavity to illustrate convection components enclosed by the shroud.
Figure 4:
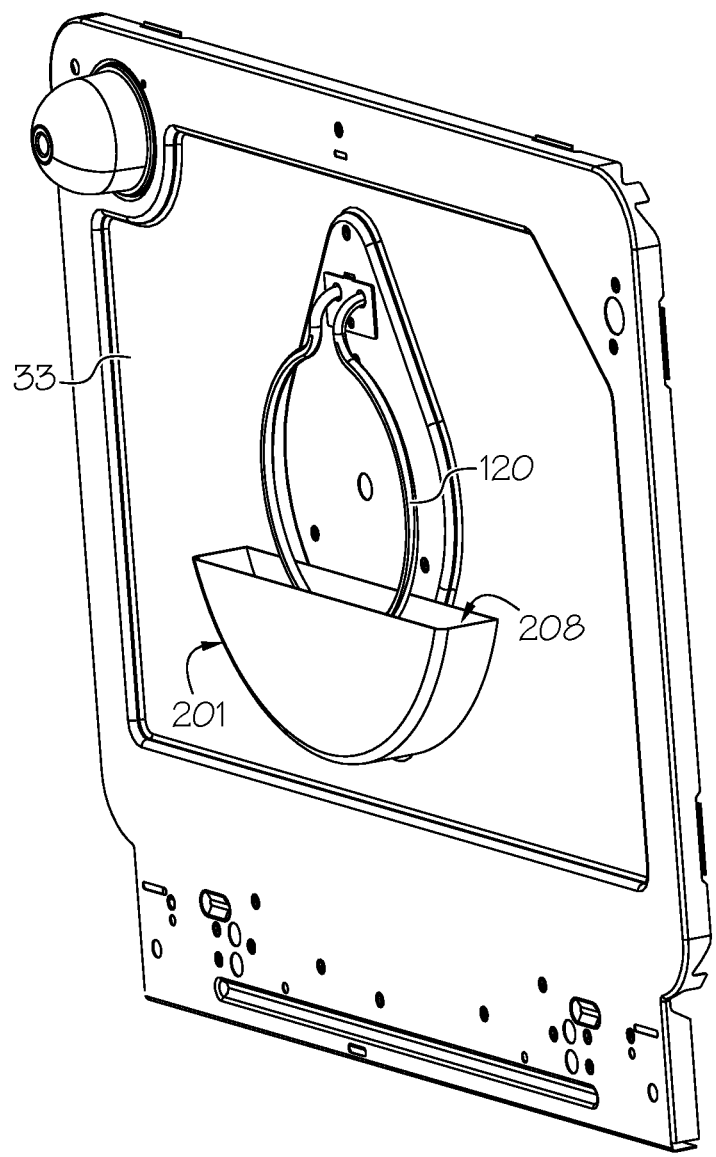
FIG. 4 shows a perspective view of the rear wall of the oven cavity of FIG. 2 with part of the shroud removed to illustrate a heater partially contained within the reservoir portion of the shroud.
Figure 5:
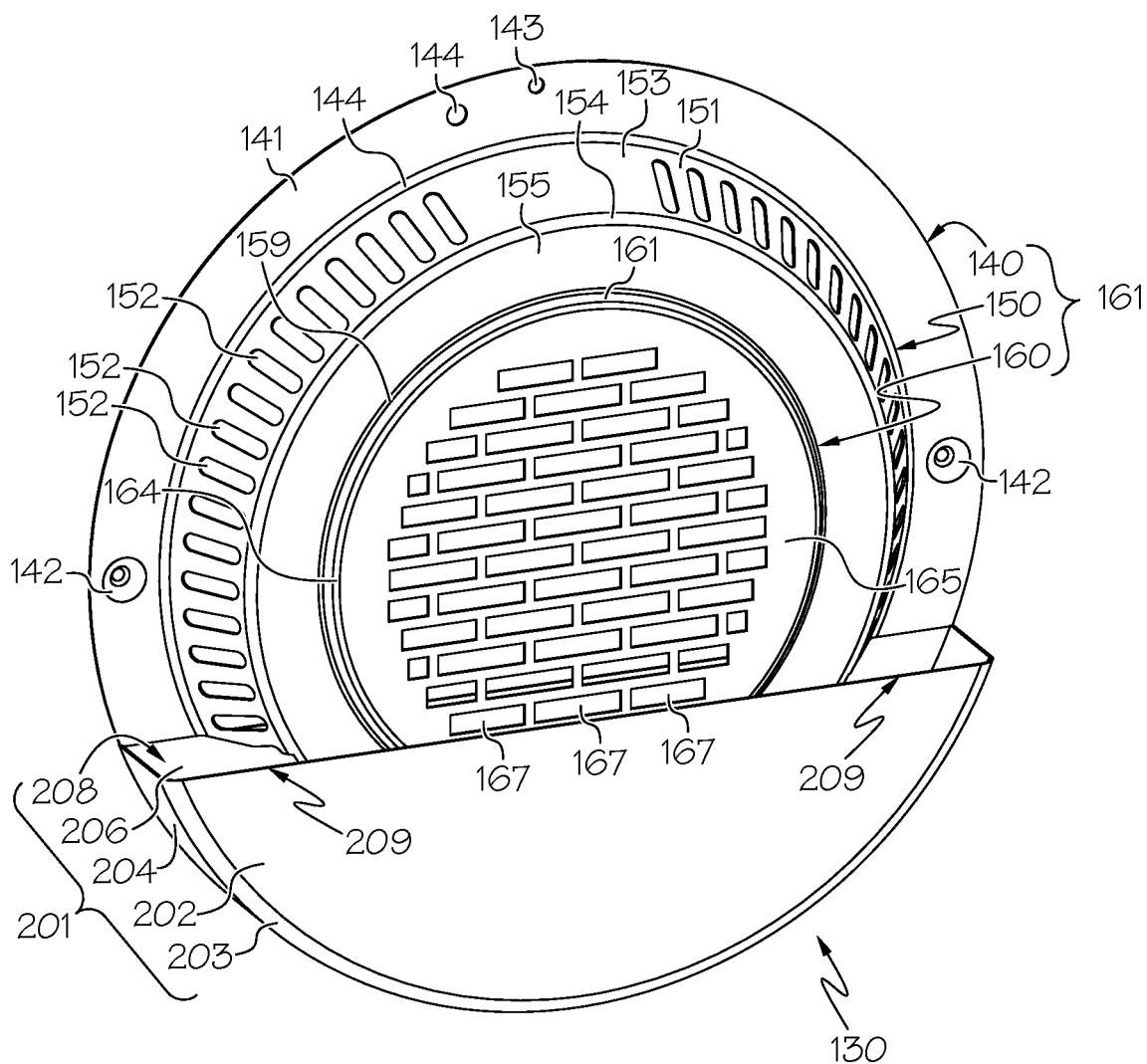
FIG. 5 shows a front perspective view of the convection shroud shown in the embodiment of FIG. 3.
Figure 6:
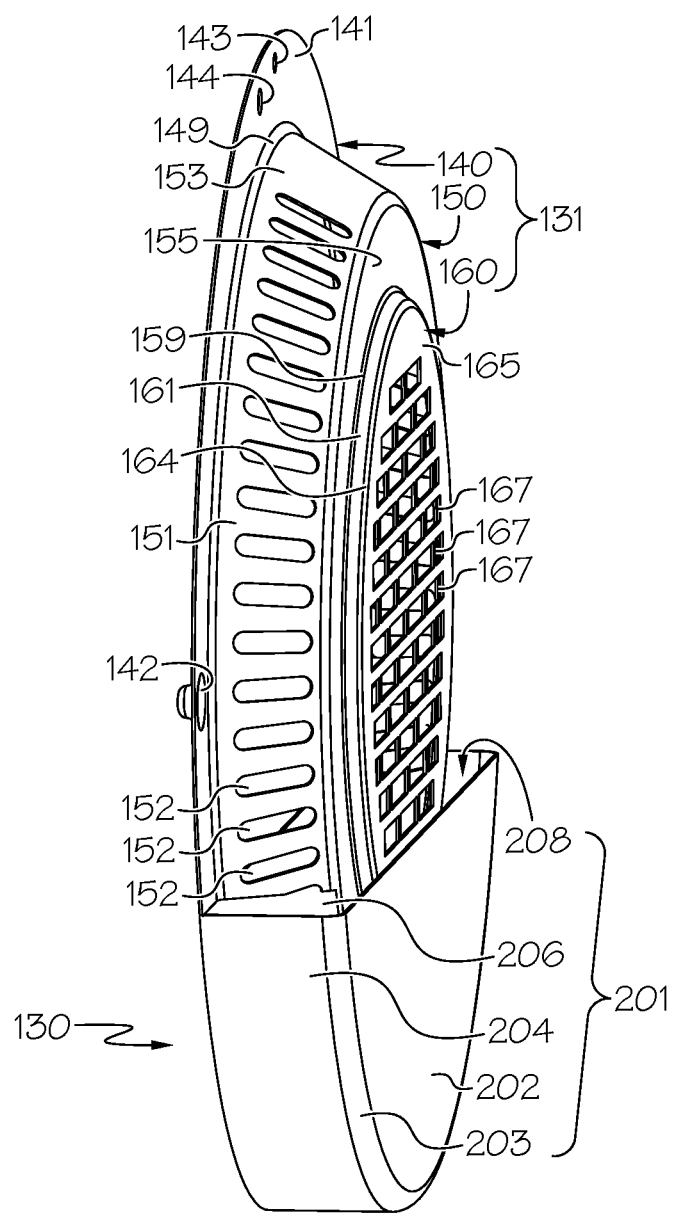
FIG. 6 shows a side perspective view of the shroud of FIG. 5.
Figure 7:
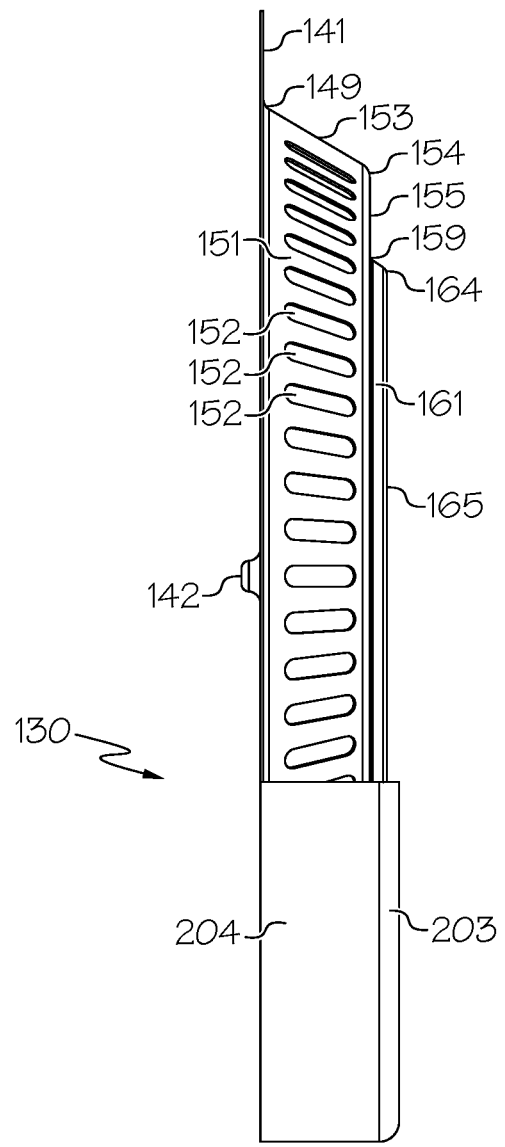
FIG. 7 shows a side view of the shroud of FIG. 5.

Referring to FIG. 3, disposed at the rear wall 33 is a convection heating system according to a first embodiment that includes a convection fan 110 configured to draw air in the oven cavity 36 and redistribute the air throughout the oven cavity 36. The fan 110 can be powered by a motor (not shown) configured to rotate the blades 111 thereof. In the illustrated embodiment, the fan is configured to draw in air from the oven cavity 36 in an axial direction and to expel the air in a radial direction as is known. This redistribution of air via the fan 110 creates an air flow regime in the oven cavity 36 such that heat therein is more evenly distributed, i.e. forced convection, allowing a food item to be cooked evenly in a controlled manner.

The convection heating system further includes a heater 120 configured to heat the air drawn by the fan 110. As depicted, the heater 120 is a tubular heating element (such as a calrod) shaped to follow a circular path substantially around the perimeter of and proximate to the fan 110. As will be appreciated, the fan will draw air from the oven cavity 36 and expel that air radially, over the circular heater 120, thus heating the air prior to being expelled back into the cavity 36 volume. Alternatively, other types of heaters known in the art and other shapes of heaters are contemplated.

Referring again to FIG. 2, to protect the fan 110 and isolate the convection heater 120 from the rest of the cavity volume, a convection shroud 130 according to the first embodiment is affixed to the rear wall 33 of the oven cavity 36 to cover, preferably enclose, the fan 110 and heater 120. As illustrated, the shroud 130 has an overall circular shape when viewed from the front (FIG. 2). However, other overall shapes for the shroud 130 are contemplated. As best seen in FIGS. 5-9, the shroud 130 includes a perforated fan cover 131 through which fluid (such as air) may flow between the receiving space 132 for the convection-system components, and the greater volume of the oven cavity 36 not covered or enclosed by the shroud 130. By "perforated," it is meant that the fan cover 131 includes openings, e.g. holes 167 and 152 (however formed), through which fluid may freely flow, for example under the influence of the fan 110, of a pressure gradient across the fan cover 131, or otherwise of hydrostatic pressure. For example, the fan cover 131 can include inlet holes 167 in a forward-facing wall of the cover 131 and outlet holes 152 in circular perimeter wall of the cover 131 that laterally surrounds the heater 120 and fan 110 wall, both for guiding air flow to and from the fan 110. These inlet holes 167 and outlet holes 152 help define air flow paths for efficient air flow to and from the fan 110. Those holes (openings) may be formed, for example, via stamping, drilling, cutting or other conventional or known technique, or they may be formed (such as cast) directly into the fan cover 131 as it is formed.

The shroud 130 also includes a water reservoir 201 that at least partially defines a generally open-topped enclosure for containing water during use. The reservoir 201 may be a fully-constituted open-topped enclosure (i.e. such that it defines the open-topped enclosure standing alone—as shown in FIGS. 5-9). Alternatively, the reservoir 201 may include front, side and bottom walls but no rear wall, such that only upon affixation to the rear wall 33 of the oven cavity 36 is the completed open-topped enclosure capable of holding water formed; i.e. defined between the reservoir 201 and the rear wall 33. As will be more fully described, the reservoir 201 is configured so that the resulting open-topped enclosure receives a lower portion of the fan cover 131 therein, such that the lower portion thereof, as well as lower portions of the heater 120 and fan 110 covered by it, can be submerged in liquid water retained in that enclosure during a steam-heating cycle of the cooking appliance.

Figure 8:
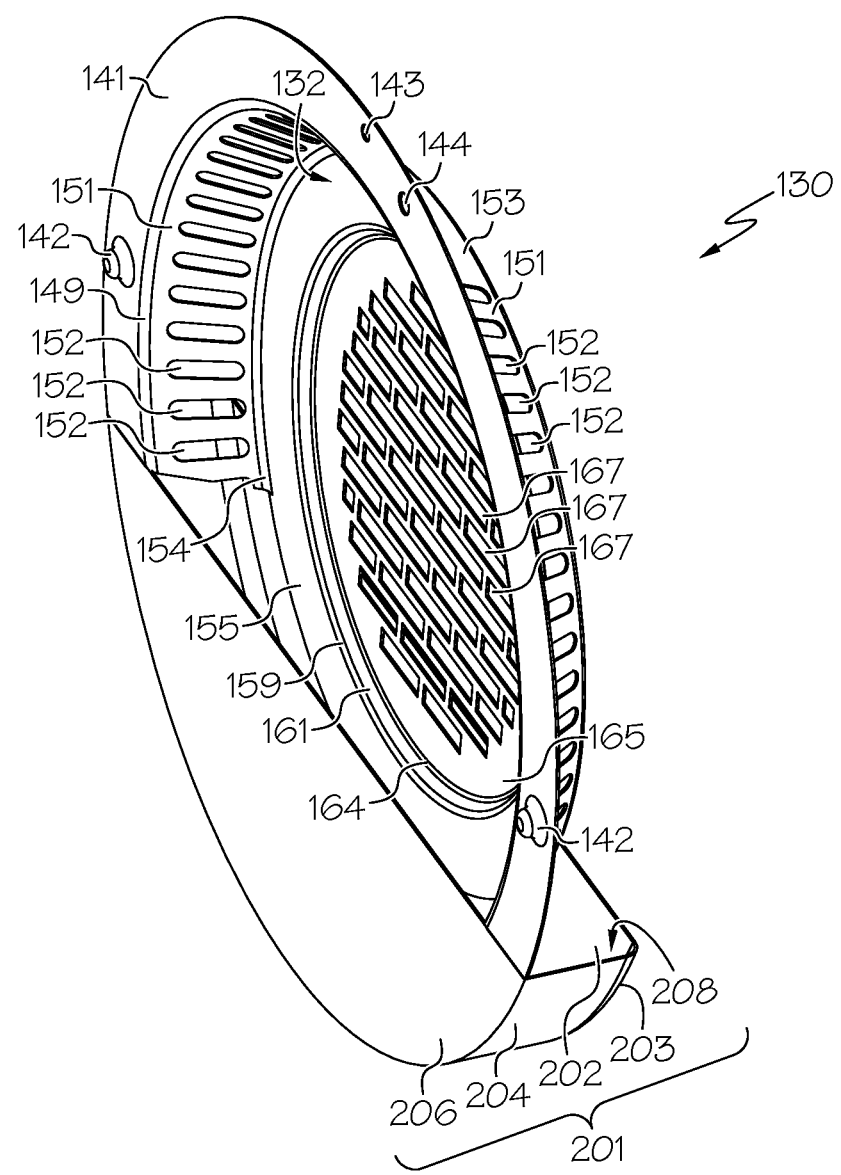
FIG. 8 shows a rear perspective view of the shroud of FIG. 5 illustrating a receiving space for receiving the convection components.
Figure 9:
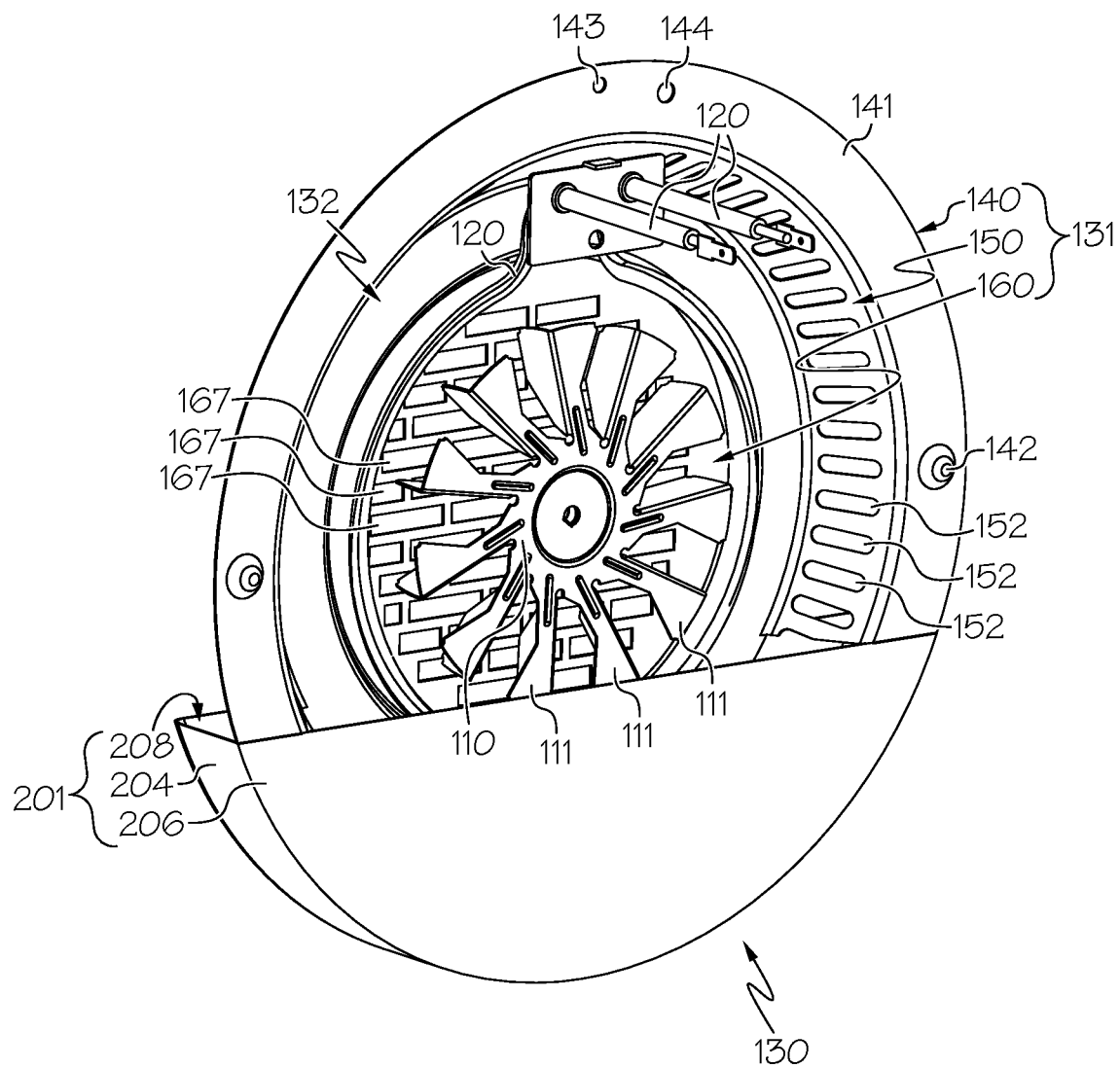
FIG. 9 shows a rear perspective view of the shroud of FIG. 5 illustrating convection components received within the receiving space.

As illustrated in FIGS. 5-10, the fan cover 131 includes an radially outer sub-portion 140 defining a perimeter flange for the cover 131, a radially intermediate sub-portion 150 defining the aforesaid circular perimeter wall, and a radially inner sub-portion 160 defining the aforesaid forward-facing wall of the cover 131. At least the intermediate and inner sub-portions 150 and 160 of the fan cover 131 together define a receiving space 132 (FIGS. 8-9) for receiving the fan 110 and heater 120 when covered by the cover 131. The outer sub-portion 140 includes an annular flange 141 defining a circumference of the cover 131. In the illustrated embodiment, a lower part of the outer sub-portion 140 is cut away so that it does not extend within the reservoir section 201. Instead, as best seen in FIGS. 8 and 9 the outer sub-portion 140 mates flush with the upper edge of the rear wall of the reservoir section 201 when assembled. In this embodiment, when the shroud 130 is assembled in place (i.e., affixed to the rear wall 33 and enclosing the fan 110 and heater 120), the annular flange 141 abuts against the rear wall 33 of the cavity 30. That flange 141 includes a number of mounting holes 142, 143, 144 such that the shroud 130 can be affixed to the rear wall 33 of the cavity 30 using fasteners (not shown). The fasteners can be semi-permanent, such as screws or bolts, such that the shroud is secured to the wall in manner that can be removed periodically, e.g. for maintenance on the fan 110 and/or the heater 120. These fasteners can be removed using tools as known in the art. Alternatively, the fasteners can be easily removable without tools or quickly with a non-power tool (e.g., clips or snap-lock elements). For example, it may be desirable that the shroud 130 be removable so that a user can add water to the reservoir 201 at a location remote from the oven cavity 36, as discussed in more detail below.

The intermediate sub-portion 150 includes the aforementioned circular perimeter wall 151, which in the illustrated embodiment is frustoconical-shaped and also has a cutaway lower portion beginning from where the perimeter wall 151 otherwise would enter the reservoir section 201 of the shroud 130. The perimeter wall 151 extends axially from the annular flange 141 forward, to an annular wall section 155 at a forward end of the fan cover 131. The perimeter wall 151 is sloped radially inward as it progresses forward toward the annular wall section 155. As seen in FIG. 8, the lower portion of the annular wall section 155 is not cutaway as are the annular flange 141 and the perimeter wall 151. Instead, the lower portion of the annular wall section 155 extends into the reservoir section 201. A front wall 165 is disposed at the center of the annular wall section 155, and may stand proud thereof via a further frustoconical wall 161 extending between the annular wall section 155 and the front wall 165.

Figure 10:
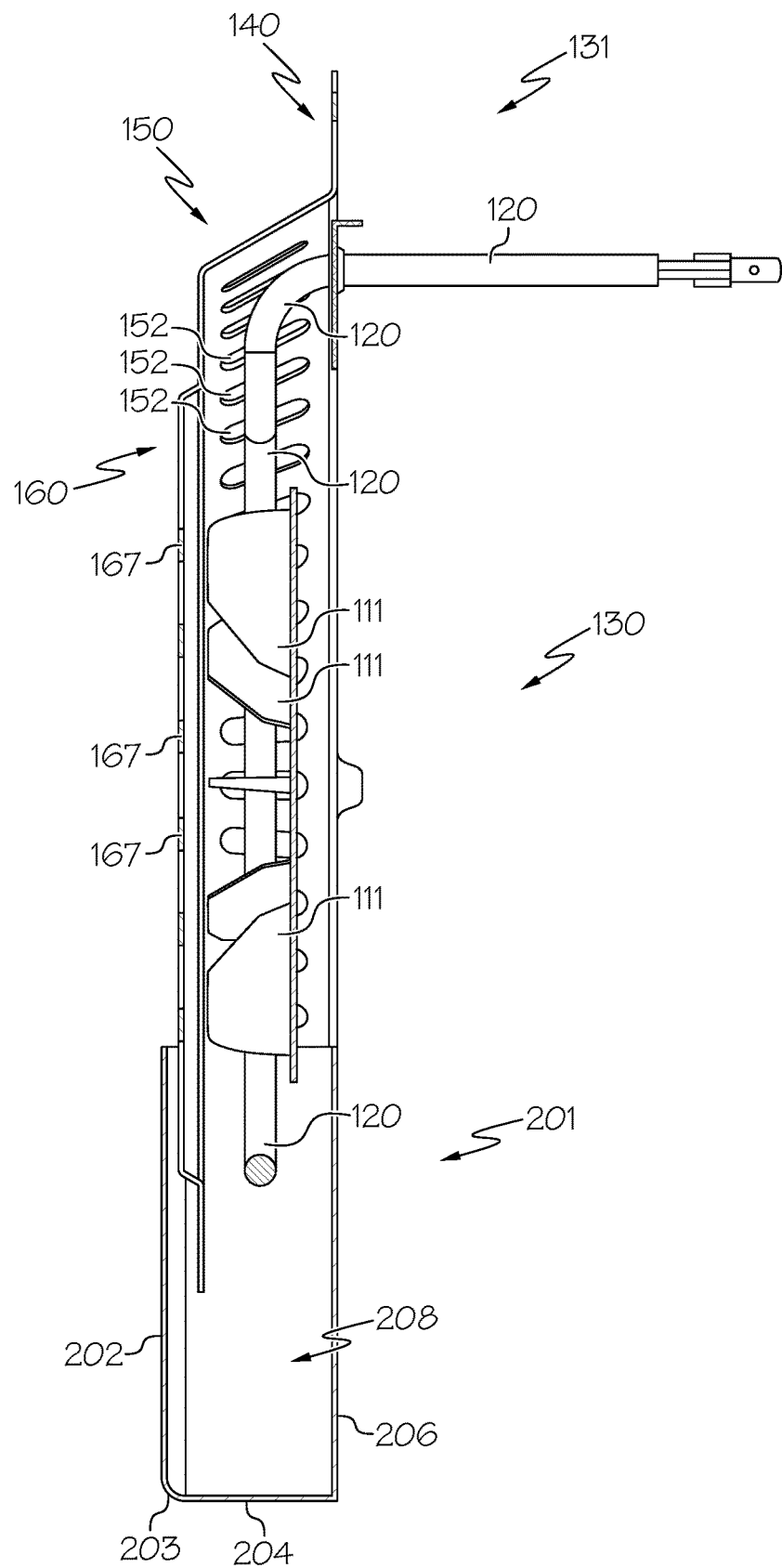
FIG. 10 shows a side cutaway side view of the shroud of FIG. 5 illustrating convection components received within the receiving space.

The axial length of the perimeter wall 151 substantially corresponds to the depth of the receiving space 132 of the fan cover 131 at the inner side thereof. For a conventional axial-fed, radial-discharge convection fan as shown, the perimeter wall 151 includes the fan outlet holes 152 to facilitate the passage of discharge air out from underneath the fan cover 131 once it has passed over the heater 120. In the illustrated embodiment, the fan outlet holes 152 are radially elongated slots with rounded ends, though other shapes are possible. The fan outlet holes 152 are distributed circumferentially about the perimeter wall 151 except for an upper central portion 153 thereof. As will be appreciated, this upper central portion 153 is adjacent the terminal ends of the heater 120 such that air exiting at this location may not be efficiently heated. Accordingly, it is preferred that there be no outlet holes 152 at this location. As mentioned above, the fan outlet holes 152 are designed to guide the air expelled by the fan 110 in a radial direction Accordingly, when the fan 110 is contained within the receiving space 132 (FIGS. 9-10), the fan outlet holes 152 are positioned radially from the fan 110 (FIG. 10).

The front wall 165 includes the fan inlet holes 167, which are shown having a rectangular shape. In alternative embodiments, the fan inlet holes 167 can have a different shape. The fan inlet holes 167 are designed to guide and accommodate incoming air from the greater oven cavity 36 towards the fan 110 in an axial direction.

Rounded transitions 149, 154, 159, 164 between adjacent walls, sections and/or flanges of the fan cover 131 can be used to provide additional mechanical strength and integrity thereto, as opposed to sharp-edged transitions. Additionally, rounded transitions 149, 154, 159, 164 make the fan cover 131 easier to clean, and are easier to form via stamping when the entire fan cover 131 is produced as a single piece, as is preferred. The fan cover 131 can be made of any suitable material, including but not limited to metals (preferred for stamping) and ceramics (wherein the cover 131 is more likely to be made via casting or molding).

With the inlet holes 167 and outlet holes 152, the fan cover 131 defines a semi-enclosed receiving space 132 which allows pressure build up therein upon influx of air through the inlet holes 167, which facilitates outflow of heated air through the outlet holes 152 during operation of the fan 110 to facilitate a convection cooking operation.

The water reservoir 201 includes a front wall 202, a side/bottom wall 204, and preferably a rear wall 206, and generally has as a cylindric section shape as depicted. The front wall 202 and rear wall 206 constitute the bases of the cylindric section, and are parallel to one another. The side/bottom wall 204 constitutes the side portion of the cylindric section shape and thus is rectangular in shape but bent to be round, thus forming a perimeter wall of the cylinder-shaped reservoir 201. The side/bottom wall 204 extends between the front wall 202 and the rear wall 204. A curved transition 203 connects the front wall 202 to the side/bottom wall 204. Together, these walls 202, 204, 206 define the aforementioned open-topped enclosure forming a storage volume 208 for water. The cylindric shape corresponds to the circular shape of the heater 120, thereby complementarily accommodating a submerged portion of the heater 120 therein to facilitate efficient heat transfer to water in the storage volume 208. Alternatively, other shapes are contemplated, particularly if the heater 120 has a different shape.

The top of the water reservoir 201 is open such that the storage volume 208 is accessible from above. Accordingly, the heater 120 extends into the storage volume 208 when installed such that it will be partially submerged in water therein to efficiently heat that water to generate steam. A water reservoir sensor (not shown) can be included inside the storage volume 208 and connected to the controller such that the controller can detect whether there is water in the storage volume 208. The storage volume 208 within the water reservoir 201 is accessible via at least two openings 209 (FIG. 5) at either side thereof defined between the perimeter wall 151 of the fan cover 131 and the front and side walls 202,204 of the reservoir 201. Water can be poured into the storage volume 208 through these openings 209 for (and preferably in advance of) a steam-cooking operation. These openings are exposed in the oven cavity (FIG. 2) such that a user also could add water into the storage volume 208 through either of the opening 209 while installed within the oven cavity 36. Additionally, as discussed above, the water reservoir 201 can be removably attached to the rear wall 33 of the oven cavity 36. Thus, the water reservoir 201 can be removed such that water can be added to the storage volume 208 at a remote location from the oven cavity, such at a kitchen sink.

Figure 15:
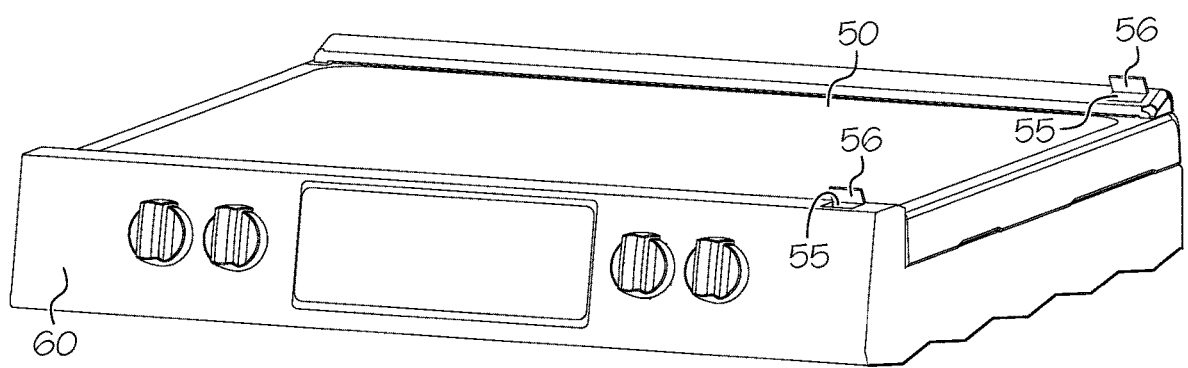
FIG. 15 shows a front perspective view of the top portion of a cooking appliance having two water fill ports at example locations.

Alternatively, as shown in FIG. 15 the oven 10 can be provided with a water filling system that includes a fill port 55 as well as piping and optionally valves extending from the fill port to the water reservoir 201 inside the oven cavity 36. In this regard, a user can add water to the water reservoir 201 without having to reach into the back of the oven cavity 36 to do so. A user can add water to the fill port 55, for example by opening a cover 56 that covers the port 55, and adding the water thereto. If the oven is a front control oven 10 as shown in FIG. 1, the port can be above or within the control panel 60 or behind the cooktop 50. Both of these locations are illustrated in FIG. 15, though only one is likely to be included in actual practice. If the oven is a rear control oven (not shown) having a control panel behind a cooktop thereof, the fill port can be part of the control panel.

As can be seen in FIGS. 8 and 9, the rear wall 206 of the water reservoir 201 is affixed to the perimeter flange 141 of the fan cover 131, preferably so that their rear surfaces are flush and can abut against the rear wall of the oven cavity 36 upon installation of the shroud 130 therein. The fan cover 131 and water reservoir 201 can be affixed in any manner known in the art, including via welding and/or fasteners (not shown). Additionally or alternatively, they can be affixed at other locations besides where the flange 141 and rear wall 206 meet. Moreover, the entire shroud 130 can be constructed of single piece that forms both the fan cover 131 and the water reservoir 201 thereof. Having the fan cover 131 and water reservoir 201 connected to one another allows the shroud 130 to be removed from the oven as a single piece, which provides ease during assembly and disassembly. For example, the shroud 130 can be removed as a single piece during cleaning of the shroud 130, the components behind the shroud 130, or during maintenance of the fan 110 and/or heater disposed behind the shroud.

The construction of the cooking appliance 10 as described above allows for the oven cavity 30 to be used in convection heating cooking mode, where the fan 110 and heater 120 operate without water inside the water reservoir 201 such that forced convection occurs inside the oven cavity 36. As mentioned above, this allows a food item to be cooked evenly in a controlled manner via conventional convection cooking. Additionally, the oven cavity 36 can be used in a steam-assisted cooking mode, where water is added into the water reservoir 201 and then converted to steam using the convection heater 120. In this embodiment, the heater 120 is used both to heat circulating air to facilitate convection cooking, and to heat water in the storage volume 208 to promote its evaporation and conversion to steam. The vaporized steam then can be carried or entrained by the circulating air to facilitate uniform distribution of steam throughout the oven cavity 36. Thus, the circulating air from fan 110 both cooks food in the oven cavity 36 via convection, and circulates steam to promote uniform steam cooking. After the available water in the storage volume 208 of the reservoir 201 has been converted to steam, the heater 120 and/or the fan 110 can be operated to maintain the cooking temperature within the oven cavity 36 and/or circulate the steam therein, allowing a food item to be cooked with the assistance of steam.

Figure 11:
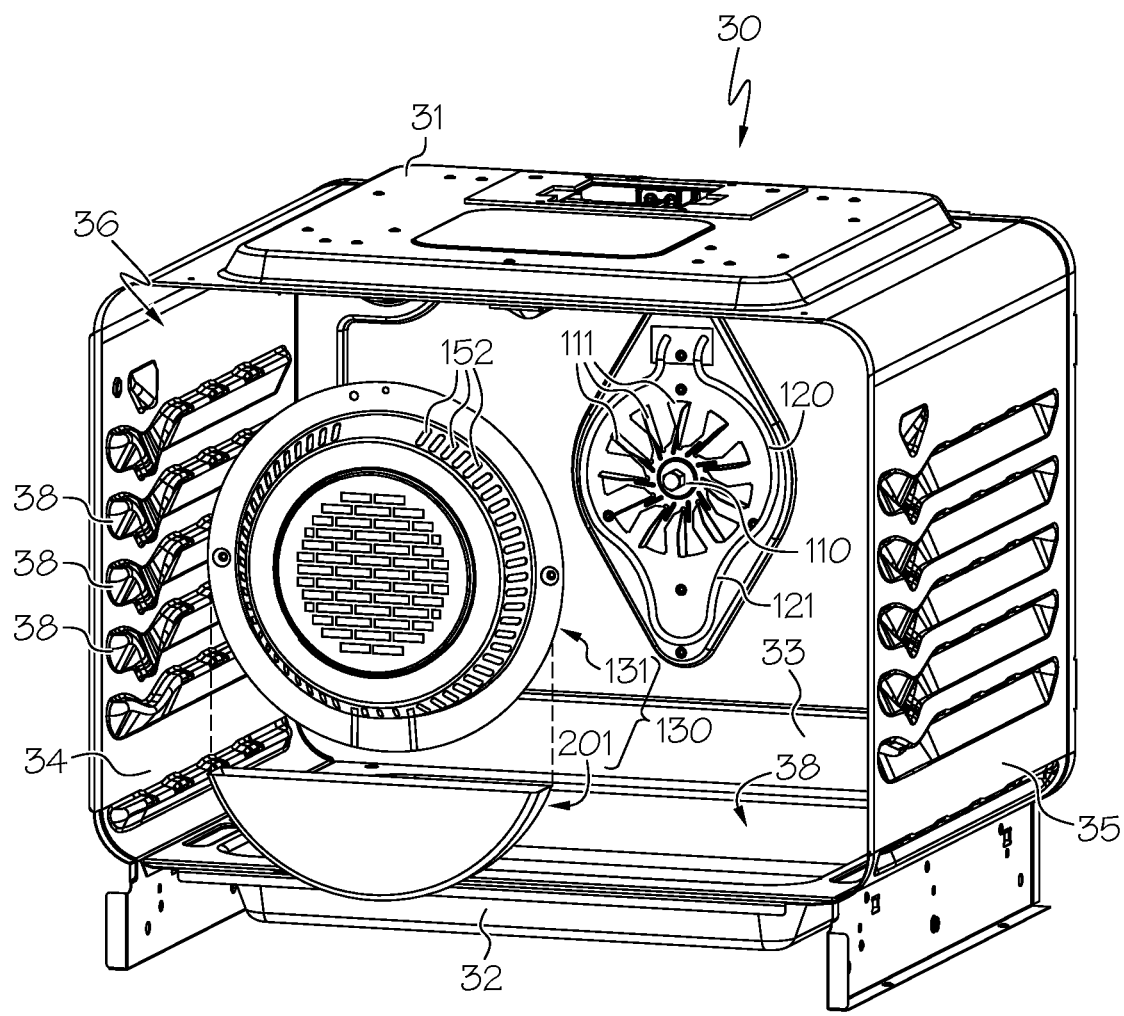
FIG. 11 shows a perspective view of an oven cavity wrapper having a heater according to a second embodiment with the fan cover and water reservoir removed.
Figure 12:
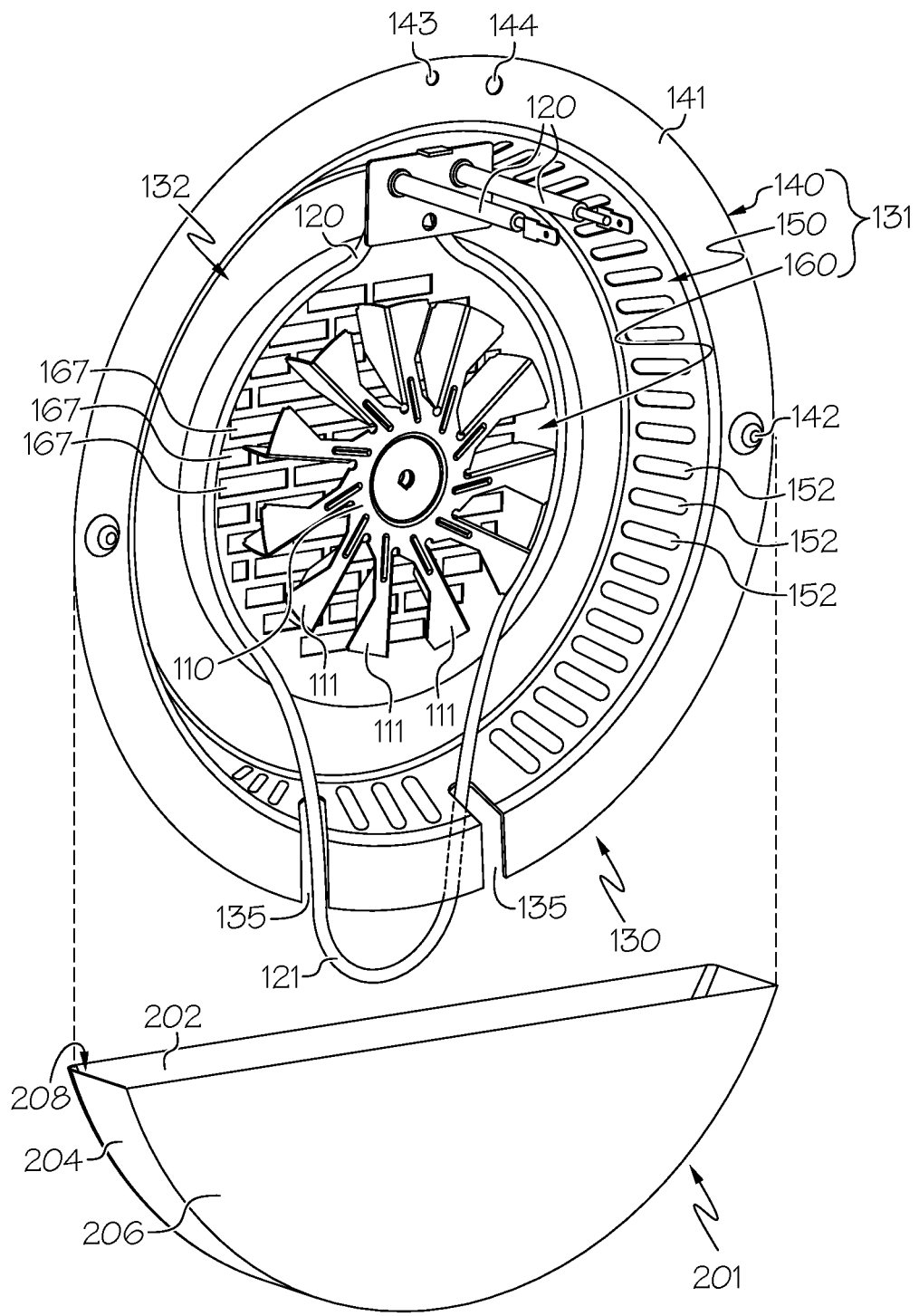
FIG. 12 shows a rear perspective view of the fan cover installed over the heating of the embodiment in FIG. 11, with the water reservoir still removed.
Figure 13:
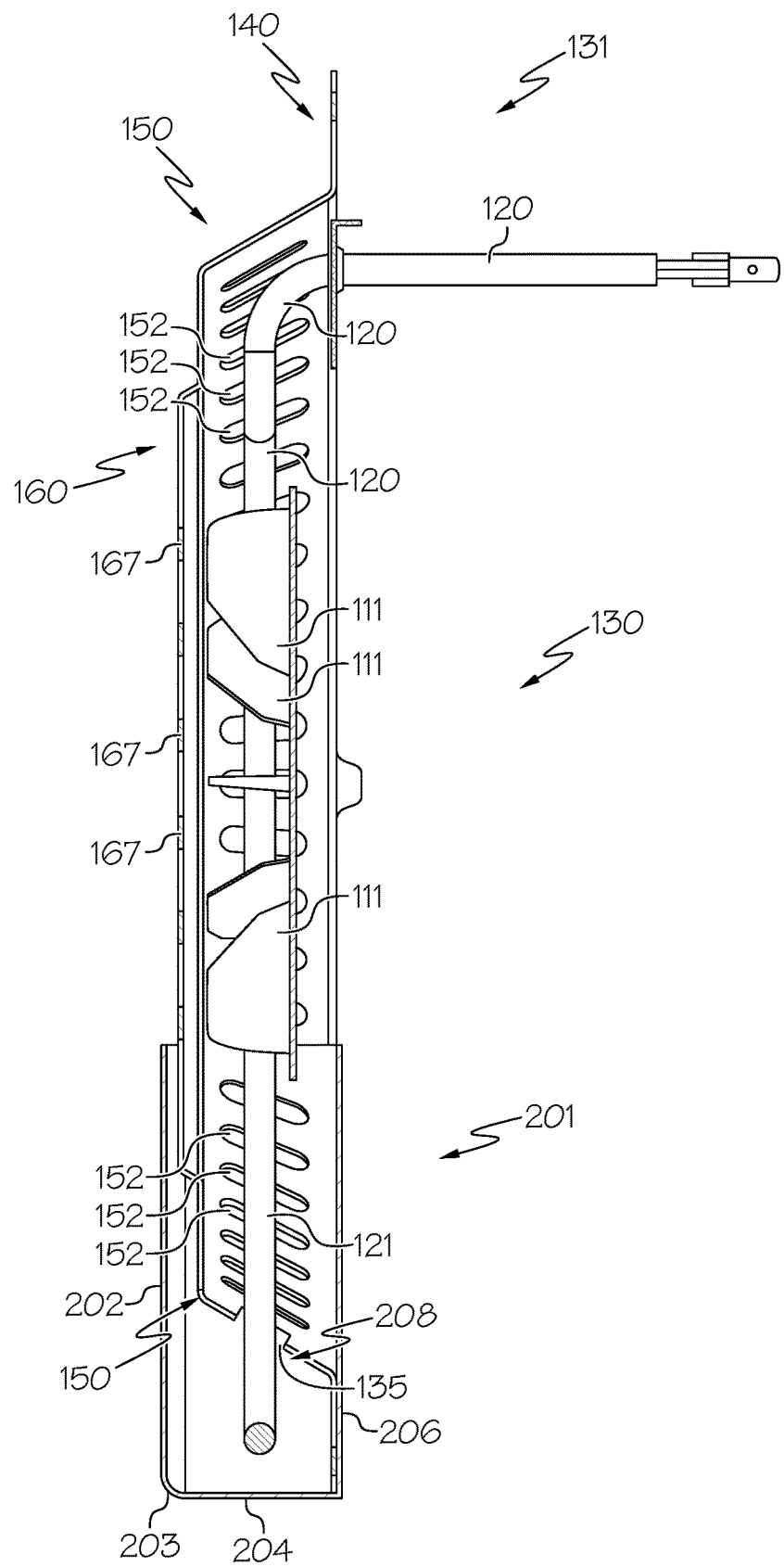
FIG. 13 shows a cutaway side view of the shroud of FIG. 11 illustrating convection components received within the receiving space with the heater partially immersed in the reservoir.

FIGS. 11-14 illustrate a second embodiment. FIG. 11 illustrates an oven cavity wrapper 30 (shown removed from the appliance) similar to that of FIGS. 2-3 of the first embodiment shown above. Disposed on the rear wall 33 of the oven cavity wrapper 30 is a convection heating system according to a second embodiment that includes a convection fan 110, heater 120, and a shroud 130 that includes a fan cover 131 and a water reservoir 201 similar to the those of the first embodiment. However, the shape of the heater 120 of the second embodiment departs from being circular at a lower section 121 thereof, instead extending downward toward a base of the storage volume 208 so that its lower, distal end is positioned adjacent to and in proximity with a bottom wall 204 of the water reservoir 201 within that volume 208. This lower section 121 of the heater extends is thus immersed deeper into the reservoir 201 volume 208 so that it is more effective to convert a greater proportion of water stored therein to steam. In this regard, as the heater 120 converts water to steam such that the water level in the storage volume is reduced, the lower section 121 is able to continue heating the remaining water such that the majority of the water contained therein can be heated to steam. It is preferred that the lower section 121 extends such that it approaches (e.g. to within 3 cm, more preferably 2 cm and most preferably 1 cm of) but does not contact the bottom wall 204 (see FIG. 13) such that the thermal energy from the lower section 121 of the heater 120 is used to convert water to steam.

In this embodiment, the shroud 130 is illustrated having the fan cover 131 easily separable (i.e. without tools) from the water reservoir 201 such that the fan cover 131 can be utilized in a convection heating mode with the water reservoir 201 removed to avoid impeding air flow when not needed to contain water. For example, while the fan cover 131 can be configured to be secured to the rear wall 33 via fasteners (not shown) inserted into mounting holes 142, 143, 144, it is preferred that the water reservoir 201 is mounted to the fan cover 131 and/or the rear wall 33 in an easily detachable manner; e.g. via a tab-in-slot connection. In this regard, it is preferred that the water reservoir 201 is attachable/detachable to the fan cover 131 and/or the rear wall 33 via methods known in the art that require minimal or no tools such that an end user can easily attach or detach the water reservoir 201. For example, when in place, the water reservoir 201 can be secured by a snap connection, clips, tab-in-slot as noted above, or via other similar connection mechanisms known in the art that require minimal or no tools. Moreover, a shroud whose fan cover and water reservoir are easily detachable also can be utilized in the first embodiment discussed above.

Figure 14:
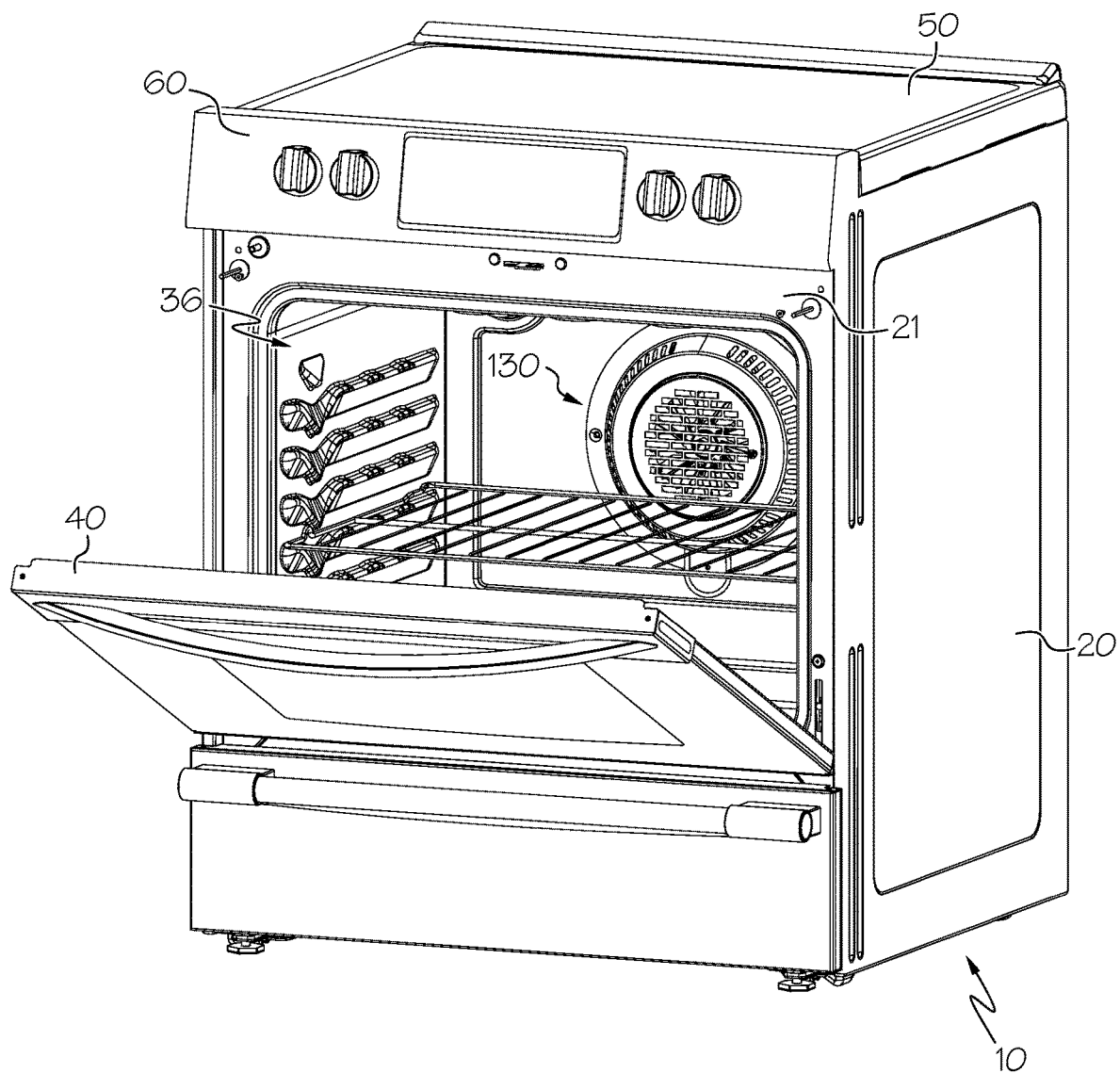
FIG. 14 shows a front perspective view of a cooking appliance having an oven cavity having a fan cover covering convection components of the cooking appliance, with the water reservoir removed.

To allow for a convection heating mode without the water reservoir 201, the fan cover 131 is configured to fully encircle the convection fan 110 when the water reservoir 201 is removed (see FIG. 14). As can be seen, the fan outlet holes 152 extend around the fan cover 131, including the portion thereof immersed within the water reservoir 201 when present, such that heated convection air can flow in all directions from the fan cover 131 when the water reservoir 201 is removed. To accommodate the lower section 121 of the heater 120, the fan cover includes slots 135. The lower section 121 of the heater 120 extends through these slots 135, which are open at the back such that the fan cover 131 can be removed for maintenance or cleaning of the convection components 110, 120.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein. The disclosure is intended to include all such modifications and alterations disclosed herein or ascertainable herefrom by persons of ordinary skill in the art without undue experimentation.

The invention claimed is:

1. A cooking appliance comprising:
an oven cavity;
a fan configured to circulate air within the oven cavity;
a heater adjacent to the fan and configured to heat the air circulated by the fan;
a water reservoir defining a storage volume configured to store water and having an open top comprising an opening of said water reservoir, wherein the heater extends through the opening into the storage volume so that at least a portion of said heater will be immersed in water when said storage volume is filled with water; and
a fan cover covering the fan and the heater in said oven cavity, said fan cover adapted to accommodate an influx of air drawn by the fan and an outflow of air expelled by the fan,
the opening of said water reservoir being exposed and accessible outside the fan cover to deliver water directly to said reservoir through the opening outside said fan cover,
said heater and said fan being operable to generate and circulate steam within the oven cavity during a steam-cooking operation.

2. The cooking appliance of claim 1, said fan cover and said water reservoir together defining a unitary convection shroud and being formed or attached together.

3. The cooking appliance of claim 2, said convection shroud being removably installed within said oven cavity via attachment to a rear wall thereof over said heater and said fan.

4. The cooking appliance of claim 3, said water reservoir being removably attached to at least one of the fan cover or the rear wall of the oven cavity.

5. The cooking appliance of claim 1, the fan cover comprising an inlet hole in a front wall thereof to accommodate said influx of air, and a plurality of outlet holes distributed circumferentially in a perimeter wall thereof that laterally surrounds the heater and the fan to accommodate said outflow of air.

6. The cooking appliance of claim 5, wherein said perimeter wall of the fan cover substantially defines a depth of a receiving space at a rear side thereof to accommodate said fan and said heater therein when the fan cover is installed at a rear wall of the oven cavity.

7. The cooking appliance of claim 1, at least a portion of said fan cover being received within the storage volume of the water reservoir.

8. The cooking appliance of claim 7, wherein the heater extends lower into the storage volume than the fan cover.

9. The cooking appliance of claim 8, wherein the heater does not contact the water reservoir.

10. The cooking appliance of claim 8, wherein the heater approaches to within 3 cm of a bottom wall of the water reservoir.

11. The cooking appliance of claim 1, wherein the water reservoir is removable from said oven cavity such that one can add water to the storage volume thereof at a location remote from the oven cavity.

12. The cooking appliance of claim 1, wherein the heater substantially surrounds the fan radially outward from the fan.

13. A cooking appliance comprising:
an oven cavity;
a fan configured to draw air in the oven cavity towards the fan and to expel and redistribute the air away from the fan, throughout the oven cavity;
a water reservoir in the oven cavity configured to store water and having an open top comprising an opening of said water reservoir;
a heater that substantially surrounds the fan and is configured to heat the air expelled by the fan such that the redistributed air is heated, wherein at least a portion of the heater extends through the opening and is received within the water reservoir such that the heater is configured to heat water present therein to steam while the fan is in operation; and
a fan cover covering the fan and the heater in said oven cavity, said fan cover adapted to accommodate an influx of air drawn by the fan and an outflow of air expelled by the fan;
the opening of said water reservoir being exposed and accessible outside the fan cover to deliver water directly to said reservoir through the opening outside said fan cover.

14. The cooking appliance of claim 13, said fan cover and said water reservoir being formed or connected together to thereby yield a unitary convection shroud that is installable on and/or removable from a rear wall of the oven cavity as a single component.

15. The cooking appliance of claim 1:
said fan being located adjacent a rear wall of said oven cavity;
said heater surrounding the fan; and
said fan cover attached to or integrally formed together with said water reservoir, wherein in operation said heater is effective to both heat water in which the heater is partially immersed within said storage volume and to heat air expelled by said fan at a location above said storage volume, wherein combined effects thereof during operation are to generate said steam from said water such that the steam is carried by said expelled air, which is heated by said heater, as the heated expelled air is distributed throughout said oven cavity.

16. The cooking appliance of claim 15, wherein the heater extends lower than the fan cover.

17. The cooking appliance of claim 1, said fan being a convection fan adjacent to a rear wall of the oven cavity and configured to circulate air within the oven cavity.

18. The cooking appliance of claim 1, wherein the fan cover extends through the opening of said water reservoir.

19. The cooking appliance of claim 13, wherein the fan cover extends through the opening of said water reservoir.

* * * * *